United States Patent
Kawashima et al.

(10) Patent No.: US 11,574,247 B2
(45) Date of Patent: Feb. 7, 2023

(54) MACHINE LEARNING BASED RECOMMENDATION OF VEHICLE

(71) Applicant: Honda Motor Co., Ltd., Tokyo (JP)

(72) Inventors: Kiyotaka Kawashima, Los Angeles, CA (US); Ting Zhang, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 542 days.

(21) Appl. No.: 16/749,069

(22) Filed: Jan. 22, 2020

(65) Prior Publication Data

US 2021/0224666 A1 Jul. 22, 2021

(51) Int. Cl.
*G06N 20/00* (2019.01)
*G06Q 30/06* (2012.01)
*G07C 5/08* (2006.01)
*G07C 5/04* (2006.01)
*G07C 5/00* (2006.01)
*G06Q 30/0601* (2023.01)

(52) U.S. Cl.
CPC ......... *G06N 20/00* (2019.01); *G06Q 30/0631* (2013.01); *G07C 5/008* (2013.01); *G07C 5/04* (2013.01); *G07C 5/0808* (2013.01); *G07C 5/0816* (2013.01); *G07C 5/0841* (2013.01)

(58) Field of Classification Search
CPC .... G06N 20/00; G06Q 30/0631; G07C 5/008; G07C 5/04; G07C 5/0808; G07C 5/0816; G07C 5/0841
USPC ...................................................... 705/26.7
See application file for complete search history.

(56) References Cited

U.S. PATENT DOCUMENTS

| | | | |
|---|---|---|---|
| 9,646,334 B2 | 5/2017 | Ishida | |
| 2008/0195435 A1 | 8/2008 | Bentley et al. | |
| 2013/0073267 A1 | 3/2013 | Gearhart et al. | |
| 2016/0035001 A1* | 2/2016 | Driscoll | G06Q 30/0631 705/26.7 |
| 2017/0076304 A1 | 3/2017 | Toth et al. | |
| 2018/0218420 A1 | 8/2018 | Cotton et al. | |
| 2019/0012603 A1* | 1/2019 | Miller | H04L 67/535 |
| 2019/0340519 A1* | 11/2019 | Bender | G06N 20/00 |
| 2020/0202410 A1* | 6/2020 | Edwards | G06Q 30/0641 |

(Continued)

FOREIGN PATENT DOCUMENTS

CN 108154388 A 6/2018

*Primary Examiner* — Krishnan Ramesh
(74) *Attorney, Agent, or Firm* — Aaron Fong; American Honda Motor Co., Inc.

(57) ABSTRACT

A vehicle recommendation device and a method for machine learning based recommendation of vehicle is provided. The vehicle recommendation device receives vehicle log data from a plurality of sensors associated with each of a first set of vehicles. The first set of vehicles are classified based on a set of vehicle types. The vehicle recommendation device generates vehicle trip data, associated with a plurality of trips of each of the first set of vehicles, based on the received vehicle log data. The vehicle recommendation device further determines a set of features, associated with the plurality of trips or with information about the first set of vehicles, based on the generated vehicle trip data. The vehicle recommendation device further generates a machine learning model which is trained based on the determined set of features to output a first type of vehicle from the set of vehicle types.

20 Claims, 5 Drawing Sheets

(56) References Cited

U.S. PATENT DOCUMENTS

| | | | |
|---|---|---|---|
| 2021/0056443 A1* | 2/2021 | Bradley | G07C 5/0816 |
| 2021/0166103 A1* | 6/2021 | Jackson | G06N 3/08 |

* cited by examiner

MACHINE LEARNING BASED RECOMMENDATION OF VEHICLE

BACKGROUND

With advancements in the automobile industry, vehicles have evolved. Various vehicles may be suited for different types of people based on certain factors, for example, work, driving patterns, budget, personal preferences, etc. In certain situations, based on user inputs received about such certain factors, a customer support staff may provide a recommendation to those people to purchase a specific type of vehicle. The provided recommendation, however, may include human errors and may not be accurate due to subjective opinions or biases.

Further limitations and disadvantages of conventional and traditional approaches will become apparent through comparison of described systems as set forth in the remainder of the present disclosure and with reference to the drawings.

SUMMARY

According to an embodiment of the present disclosure, a vehicle recommendation device having a machine learning based recommendation is provided. The vehicle recommendation device may include circuitry. The circuitry may receive vehicle log data from a plurality of sensors associated with each of a first set of vehicles. The first set of vehicles may be classified based on a set of vehicle types. The circuitry may generate vehicle trip data associated with a plurality of trips of each of the first set of vehicles based on the received vehicle log data. The circuitry may determine a set of features, associated with the plurality of trips or with the information about the first set of vehicles, based on the generated trip data. The circuitry may generate a machine learning model that is trained based on the determined set of features to output a first type of vehicle from the set of vehicle types.

According to another embodiment of the present disclosure, a method for a machine learning based recommendation of a vehicle is provided. The method may include receiving vehicle log data from a plurality of sensors associated with each of a first set of vehicles. The first set of vehicles may be classified based on a set of vehicle types. The method may further include generating vehicle trip data associated with a plurality of trips of each of the first set of vehicles based on the received vehicle log data. The method may further include determining a set of features, associated with the plurality of trips or with information about the first set of vehicles, based on the generated vehicle trip data. The method may further include generating a machine learning model which is trained based on the determined set of features to output a first type of vehicle from the set of vehicle types.

According to another embodiment of the present disclosure, a non-transitory computer-readable medium is provided. The non-transitory computer-readable medium may have stored thereon computer implemented instructions that, when executed by a computer, causes the computer to execute operations. The operations may include receiving vehicle log data from a plurality of sensors associated with each of a first set of vehicles. The first set of vehicles may be classified based on a set of vehicle types. The operations may further include generating vehicle trip data associated with a plurality of trips of each of the first set of vehicles based on the received vehicle log data. The operations may further include determining a set of features, associated with the plurality of trips or with information about the first set of vehicles, based on the generated vehicle trip data. The operations may further include generating a machine learning model which is trained based on the determined set of features to output a first type of vehicle from the set of vehicle types.

Figure 1:
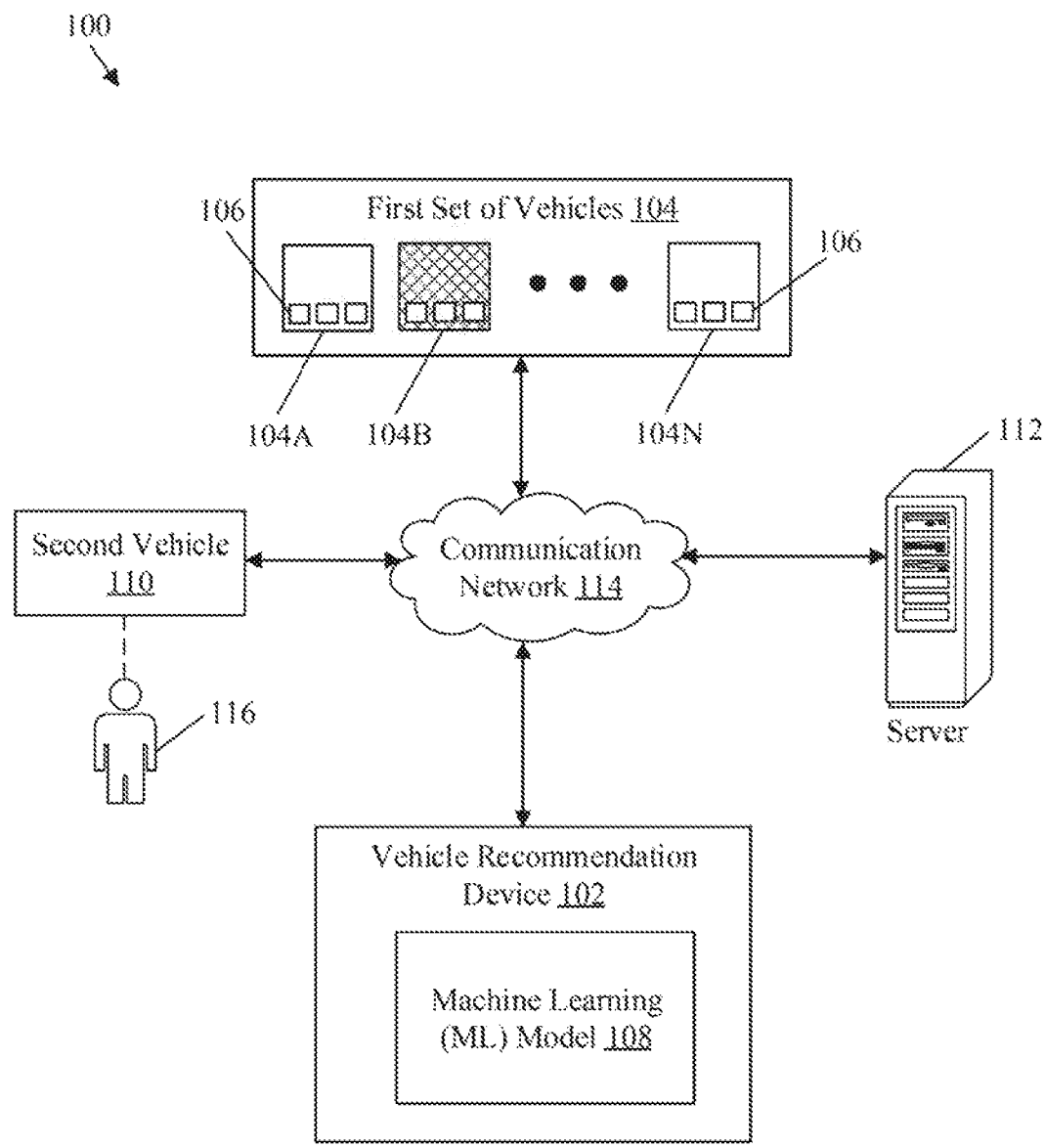
FIG. 1 is a block diagram that illustrates an exemplary network environment for machine learning based recommendation of vehicle, in accordance with an embodiment of the present disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed vehicle recommendation device having a machine learning based recommendation. Exemplary aspects of the present disclosure may provide a vehicle recommendation device that may be configured to receive vehicle log data from a plurality of sensors (for example, but is not limited to, a vehicle speed sensor, a fuel gauge sensor, a temperature sensor, etc.) that may be associated with a first set of vehicles which may be classified based on a set of vehicle types (for example, but is not limited, full hybrid electric vehicles (FHEV), Non-full hybrid electric vehicles (FHEV), etc.). The vehicle recommendation device may be further configured to generate vehicle trip data (for example, but is not limited to, trip speed, trip route, trip locations, trip time, etc.) based on the received vehicle log data. The generated vehicle trip data may be associated with a plurality of trips of each of the first set of vehicles. The vehicle recommendation device may be further configured to determine a set of features (for example, but is not limited to, a refuel_bin feature, refuel_freq feature, a mile_d_freq feature, an avg_trip_mileage feature, a zipcode feature, as described in detail, for example, in Tables 1 and 2) based on the generated vehicle trip data. The set of features may be associated with the plurality of trips or with the information about the vehicle (for example, but is not limited to, vehicle model, vehicle type, etc.). The vehicle recommendation device may be further configured to generate a machine learning model (for example, but is not limited to, binary classification model) which may be trained based on the determined set of features to output a first type of the vehicle from the set of vehicle types. The vehicle recommendation device may be further configured to receive a set of values associated with the set of features from a user of a second vehicle. The user may be associated with the second vehicle. The second vehicle may be different from the first set of vehicles based on which the machine learning model may be trained. The vehicle recommendation device may be further configured to apply the generated machine learning model on the received set of values of the second vehicle and further recommend the first type of vehicle to the user of the second vehicle based on the output of the generated machine learning model. Therefore, a trained machine learning model may be generated based on the vehicle log data (for example trip data, fueling behavior, etc.) of several vehicles (i.e. first set of vehicles) and further a vehicle type recommendation may be provided by the disclosed vehicle recommendation device based on the trained machine learning model to a new vehicle (i.e. the second vehicle) or to associated user or customer. The trained machine learning model may provide more accurate recommendation of the vehicle type to the customer or the user of the second vehicle (i.e. on which the model may not be trained).

The disclosed vehicle recommendation device may be useful for a vehicle manufacturer or distributors to predict future sales of a particular type of vehicle. The generation or the training of the machine learning model based on the collected vehicle log data may further assist the vehicle manufacturer or the distributor to accurately analyze various behaviors or patterns of different vehicles and associated users, and accordingly recommend a correct type of vehicle to other users, who may not have purchased or changed respective vehicle recently. This may further optimize or improve overall business sales of a particular organization (for example, manufacture, distributor, etc.) associated with the disclosed vehicle recommendation device.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a block diagram that illustrates an exemplary network environment for machine learning based recommendation of vehicle, in accordance with an embodiment of the disclosure. There is shown a network environment diagram 100 which may include a vehicle recommendation device 102. There is further shown a first set of vehicles 104. The first set of vehicles 104 may include a first vehicle 104A, a second vehicle 104B, and an Nth vehicle 104N. Each of the first set of vehicles 104 may be associated with (or include) a plurality of sensors 106. There is also shown a machine learning model 108 which may be generated by the vehicle recommendation device 102.

There is further shown a second vehicle 110 and a server 112 which may communicate with the vehicle recommendation device 102, via a communication network 114. There is further shown a user 116 who may be associated with the second vehicle 110. The user 116 may be, but is not limited to, an owner, an occupant, or a driver of the second vehicle 110.

The vehicle recommendation device 102 may include suitable logic, circuitry, interfaces, and/or code that may be configured to recommend a vehicle based on machine learning. The vehicle recommendation device 102 may receive vehicle log data from the plurality of sensors 106 associated with each of the first set of vehicles 104. The vehicle recommendation device 102 may be configured to generate vehicle trip data associated with a plurality of trips of each of the first set of vehicles 104 based on the received vehicle log data. The vehicle recommendation device 102 may be further configured to determine a set of features (i.e. associated with the plurality of trips or with information about the first set of vehicles 104) based on the generated vehicle trip data. The vehicle recommendation device 102 may be further configured to generate the machine learning model 108. The generated machine learning model 108 may be trained based on the determined set of features to output a first type of vehicle from the set of vehicle types. The vehicle recommendation device 102 may be further configured to receive a first set of values associated with the set of features from a second vehicle 110. The second vehicle 110 may be different from the first set of vehicles and may be associated with (or either owned or leased by) the user 116. The vehicle recommendation device 102 may be further configured to apply the generated machine learning model 108 on the received set of values of the second vehicle 110 and recommend the first type of vehicle to the user 116 based on the output of the generated machine learning model 108.

Examples of the vehicle recommendation device 102 may include, but are not limited to, a computing device, a smartphone, a cellular phone, a mobile phone, a mainframe machine, a server, a computer workstation, and/or a consumer electronic (CE) device. In an embodiment, the vehicle recommendation device 102 may be associated with a manufacturer of a vehicle. In other embodiments, the vehicle recommendation device 102 may be associated with a seller or dealer of vehicles who may want to recommend vehicle types to a user or customer (such as, but is not limited to, the user 116).

The first set of vehicles 104 may include a plurality of vehicles for example the first vehicle 104A, the second vehicle 104B, and the Nth vehicle 104N. Each of the first set of vehicles 104 may be a non-autonomous vehicle, a semi-autonomous vehicle, or a fully autonomous vehicle, for example, as defined by National Highway Traffic Safety Administration (NHTSA). Examples of each of the first set of vehicles 104 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. Each vehicle of the first set of vehicles 104 may be a system through which a user (for example rider) may travel from a start point to a destination point.

Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car. It may be noted here that the block diagram of each vehicle of the first set of vehicles 104 is merely shown as examples in FIG. 1. The present disclosure may be also applicable to other structures, designs, or shapes of the first set of vehicles 104.

The description of other types of the vehicles and respective structures, designs, or shapes has been omitted from the disclosure for the sake of brevity. The first set of vehicles 104 may be further classified based on a set of vehicle types. The set of vehicle types may include a FHEV type and a Non-FHEV type. For example, the first vehicle 104A and the Nth vehicle of the first set of vehicles 104 shown in FIG. 1 may be of the FHEV type and the second vehicle 104b of the first set of vehicles 104 may be of the Non-FHEV type.

The second vehicle 110 may be a non-autonomous vehicle, a semi-autonomous vehicle, or a fully autonomous vehicle, for example, as defined by National Highway Traffic Safety Administration (NHTSA). The second vehicle 110 may be different from the first set of vehicles 104 i.e. the second vehicle 110 may not be present in the first set of vehicles 104. The second vehicle 110 may be associated with the user 116. The second vehicle 110 may be a system through which the user 116 may travel from a start point to a destination point. Functions and/or an operational configuration of the second vehicle 110 may be same as the functions and/or the operational configuration of one of the first set of vehicles 104. Therefore, further description of the second vehicle 110 is omitted from the disclosure for the sake of brevity.

The plurality of sensors 106 may include suitable logic, circuitry, interfaces, and/or code that may be configured to collect and store data about a set of parameters of each vehicle of the first set of vehicles 104 in a real time or near real-time basis. The set of parameters may include, but is not limited to, a speed parameter, a distance parameter, a navigation parameter, a fuel parameter, a temperature parameter, a pressure parameter, or a timing parameter. The plurality of sensors 106 may be associated with each vehicle of the first set of vehicles 104. Examples of the plurality of sensors 106 may include, but not limited to, an engine speed sensor, a vehicle speed sensor, a fuel gauge sensor, a temperature sensor, a navigation sensor, a real-time clock, a trip computing device, an accelerometer, a carbon-emission sensor, a fuel consumption sensor, an engine revolution per minute (RPM) sensor, a throttle position sensor, a pressure sensor, or a battery voltage sensor.

The Machine Learning model 108 may be a classifier which may be trained to identify a relationship between inputs, such as the set of features in a training dataset and output labels. The ML model 108 may be defined by its hyper-parameters, for example, number of weights, cost function, input size, number of layers, and the like. The hyper-parameters of the ML model 108 may be tuned and weights may be updated so as to move towards a global minima of a cost function for the ML model 108. After several epochs of the training on the feature information in the training dataset, the ML model 108 may be trained to output a prediction/classification result for a set of inputs. The prediction result may be indicative of a class label for each input of the set of inputs (e.g., input features extracted from new/unseen instances).

The ML model 108 may include electronic data, such as, for example, a software program, code of the software program, libraries, applications, scripts, or other logic or instructions for execution by a processing device, such as the vehicle recommendation device 102. The ML model 108 may include code and routines configured to enable a computing device, such as the vehicle recommendation device 102 to perform one or more operations for classification of one or more inputs into a FHEV class or a Non-FHEV class. Additionally, or alternatively, the ML model 108 may be implemented using hardware including a processor, a microprocessor (e.g., to perform or control performance of one or more operations), a field-programmable gate array (FPGA), or an application-specific integrated circuit (ASIC). Alternatively, in some embodiments, the ML model 108 may be implemented using a combination of hardware and software.

The server 112 may comprise suitable logic, circuitry, interfaces that may be configured to store the vehicle log data for each of the first set of vehicles 104. In some embodiments, the server 112 may be configured to generate the ML model 108. In some embodiments, the server 112 may be configured to train the generated ML model 108 to generate an output based on which a recommendation for a type of vehicle may be provided to the user 116. The server 112 may be implemented as a cloud server which may execute operations through web applications, cloud applications, HTTP requests, repository operations, file transfer, and the like. Other examples of the server 112 may include, but are not limited to, a customer relationship management database server, a database server, a file server, a web server, a media server, content server, an application server, a mainframe server, a cloud server, or other types of servers. In one or more embodiments, the server 112 may be implemented as a plurality of distributed cloud-based resources by use of several technologies that are well known to those skilled in the art.

The communication network 114 may include a communication medium through which the vehicle recommendation device 102, the first set of vehicles 104, the second vehicle 110 and the server 112 may communicate with each other. The communication network 114 may be one of a wired connection or a wireless connection. Examples of the communication network 114 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in FIG. 1 may be configured to connect to the communication network 114 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, a company or an organization may require the vehicle recommendation device 102 that may be able to recommend a type of vehicle (such as, but not limited to, FHEV or non-FHEV) to the user 116 based on a set of features corresponding to the various vehicles which may or may not be associated with the user 116. The vehicle recommendation device 102 may be configured to generate the machine learning model 108 that may recommend a type of new vehicle to the user 116 to purchase, based on the set of features determined for the first set of vehicles 104. The type of the new vehicle may be one of a FHEV or Non-FHEV vehicle, or other types of vehicles (such as, but not limited to, micro hybrid electric vehicles (S&S), mild hybrid electric vehicles (MHEV), and Plug-in hybrid electric vehicles (PHEV). The vehicle recommendation device 102 may be configured to receive the vehicle log data from each of the first set of vehicles 104 which may include the first vehicle 104A, the second vehicle 104B, and the Nth vehicle 104N as shown in FIG. 1. The first set of vehicles 104 may be further classified into the set of vehicle types (for example, but is not limited to, a FHEV, a Non-FHEV, or others).

Each vehicle of the first set of vehicles 104 may have the plurality of sensors 106 that may be disposed or integrated in the first set of vehicles 104. Examples of the plurality of sensors 106 may include, but is not limited to, a location sensor, a real-time clock, a trip computing device, a vehicle speed sensor, an accelerometer, a carbon-emission sensor, a fuel consumption sensor, an engine revolution per minute (RPM) sensor, a temperature sensor, a throttle position sensor, a pressure sensor, or a battery voltage sensor.

The vehicle recommendation device 102 may be configured to receive the vehicle log data from the plurality of sensors 106 associated with each of the first set of vehicles 104 or from an electronic control unit (ECU) of each of the first set of vehicles 104. For example, the vehicle log data may include, but is not limited to, timestamps of collection of vehicle data, speed data of vehicle, geographical locations of collection of vehicle data, re-fuel data, or mileage data. Details of the vehicle log data is described further.

The vehicle recommendation device 102 may be further configured to generate vehicle trip data associated with the plurality of trips of each of the first set of vehicles 104. The vehicle trip data may be generated based on the received vehicle log data. For example, the vehicle recommendation device 102 may be configured to consider the collected timestamps, and data related to distance covered to generate information about a particular trip associated with the first vehicle 104A of the first set of vehicles 104. The vehicle recommendation device 102 may be further configured to determine the set of features based on the generated vehicle trip data. The set of features maybe associated with the plurality of trips or with the information (for example, but is not limited to, a model number, brand, or a manufacturing year) about the first set of vehicles 104. The generated set of features may include a first subset of features, a second subset of features, and a third subset of features. The first subset of features may indicate a fueling behavior of the first set of vehicles 104, the second subset of features may indicate trip information and routine information associated with the first set of vehicles 104, and the third subset of features may indicate the information about the first set of vehicles 104. The determination of the set of features is described in detail, for example, in FIGS. 3 and 4.

The vehicle recommendation device 102 may be further configured to associate a weight parameter with each feature of the determined set of features. The weight parameter associated with each feature may indicate an importance of the corresponding feature in generation of the ML model 108. The details of the weight parameter are described below. The vehicle recommendation device 102 may be further configured to generate the machine learning model 108 which may be trained based on the determined set of features for each of the first set of vehicles 104 to output the first type of vehicle from the set of vehicle types. In some embodiments, the machine learning model 108 may be trained based on the weight parameter associated with each feature of the determined set of features to output the first type of vehicle from the set of vehicle types. The generated machine learning model 108 is described below.

In an embodiment, the vehicle recommendation device 102 (i.e. including the trained machine learning model 108) may be configured to receive a set of values associated with the set of features from the second vehicle 110. The second vehicle 110 may be different from the first set of vehicles 104 based on which the machine learning model 108 may be generated/trained. The second vehicle 110 may be associated with the user 116 who may be looking to buy a new vehicle. In some embodiments, the second vehicle 110 may be owned by the user 116. In some other embodiments, the second vehicle 110 may be lease-purchased by the user 116 and the user 116 may be using the second vehicle 110 for a period of time for commute and/or other purposes.

In accordance with the embodiment, the vehicle recommendation device 102 may be configured to apply the generated machine learning model 108 on the received set of values of the second vehicle 110. The vehicle recommendation device 102 may be further configured to control the generated machine learning model 108 to output a final value. The output final value may be based on the application of the generated machine learning model 108 on the received set of values of the second vehicle 110. The vehicle recommendation device 102 may be further configured to compare the output final value with a predefined threshold value. The threshold value may be value that may differentiate a class of the first type of vehicles from a class of a second type of vehicles included in the set of vehicle types. For example, if the output final value is below the predefined threshold value, the first type of vehicle (for example FHEV) may be recommended, and if the output final value is equal to or above the threshold value, the second type of vehicle (for example non-FHEV) may be recommended or vice-versa. The vehicle recommendation device 102 may be further configured to recommend the first type of vehicle or the second type of vehicle to the user 116 associated with the second vehicle 110 based on the comparison. Details of the application of the machine learning model 108 and the recommendation of type of vehicle is further described below.

Figure 2:
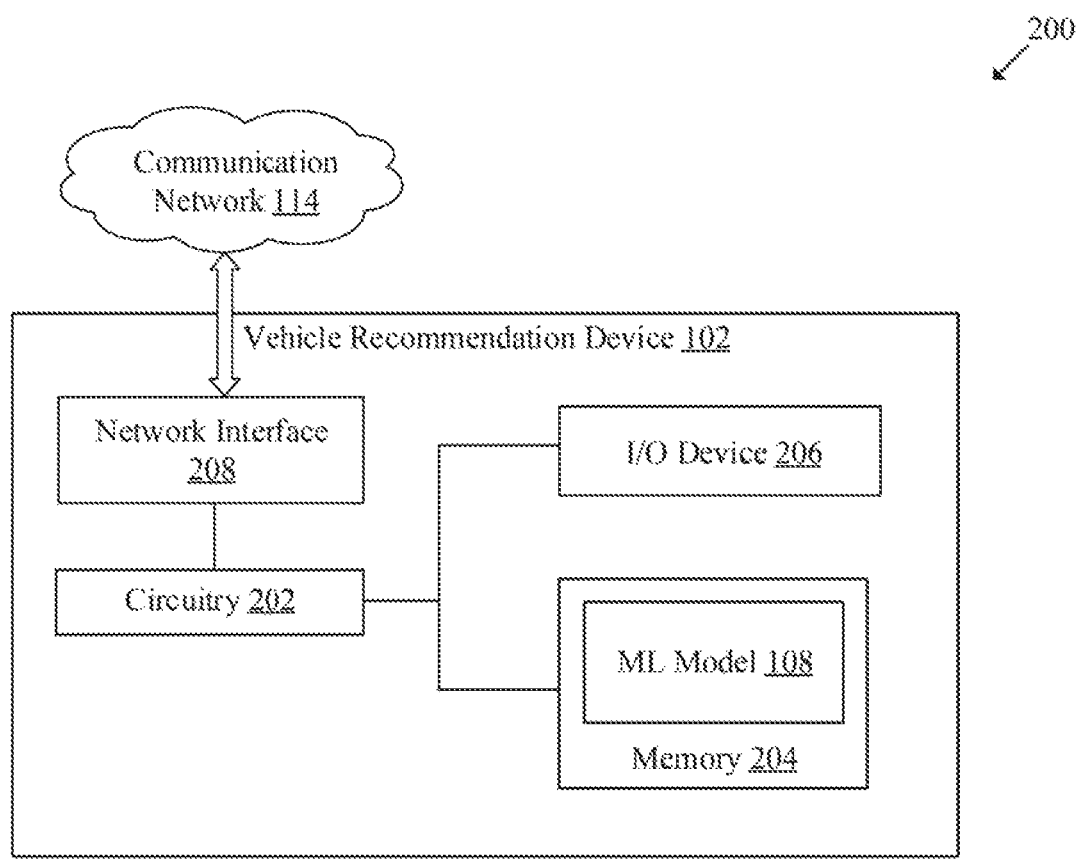
FIG. 2 is a block diagram that illustrates an exemplary vehicle recommendation device for machine learning based recommendation of vehicle, in accordance with an embodiment of the present disclosure.

FIG. 2 is a block diagram that illustrates an exemplary vehicle recommendation device for machine learning based recommendation of vehicle, in accordance with an embodiment of the present disclosure. FIG. 2 is explained in conjunction with elements from FIG. 1. There is shown a block diagram 200 of the vehicle recommendation device 102. The vehicle recommendation device 102 may include circuitry 202, a memory 204, an input/output (I/O) device 206 and a network interface 208. The circuitry 202 may be connected to the memory 204, the I/O device 206 and the network interface 208 through wired or wireless connections. Although in FIG. 2, it is shown that the vehicle recommendation device 102 includes the circuitry 202, the memory 204, the I/O device 206 and the network interface 208; however, the disclosure may not be so limiting and the vehicle recommendation device 102 may include less or more components to perform the same or other functions of the vehicle recommendation device 102.

The circuitry 202 may include suitable logic, circuitry, interfaces, and/or code that may be configured to execute a set of operations related to generation of the machine learning model 108 and application of the generated machine learning model 108. The set of operations may include, but is not limited to, reception of the vehicle log data, generation of the vehicle trip data, determination of the set of features, and generation of the machine learning model 108. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform or direct performance of any number of operations of the vehicle recommendation device 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. The memory 204 may be configured to store the received vehicle log data and the generated vehicle trip data. The memory 204 may be further configured to store the generated ML model 108. In some embodiments, the memory 204 may be further configured to store the set of features along with the corresponding weight parameter. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to may receive user inputs and generate outputs in response to the received user inputs. The I/O device 206 may include one or more input and output devices that may communicate with different components of the vehicle recommendation device 102 and the first set of vehicles 104. Examples of the I/O device 206 may include, but are not limited to, a display device, a touch screen, a digital dial/knob, a touch buttons, a microphone, a gesture controller, and/or an image sensor. In an embodiment, the I/O device 206 may be configured to display the recommended type of vehicle to the user 116 based on the output provided by the trained machine learning model 108.

The network interface 208 may include suitable logic, circuitry, and interfaces that may be configured to facilitate communication between the circuitry 202, the first set of vehicles 104, the second vehicle 110, and the server 112, via the communication network 114. The network interface 208 may be implemented by use of various known technologies to support wired or wireless communication of the vehicle recommendation device 102 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The functions or operations executed by the vehicle recommendation device 102, as described in FIG. 1, may be performed by the circuitry 202. Operations executed by the circuitry 202 are described in detail, for example, in the FIGS. 3, 4, and 5.

Figure 3:
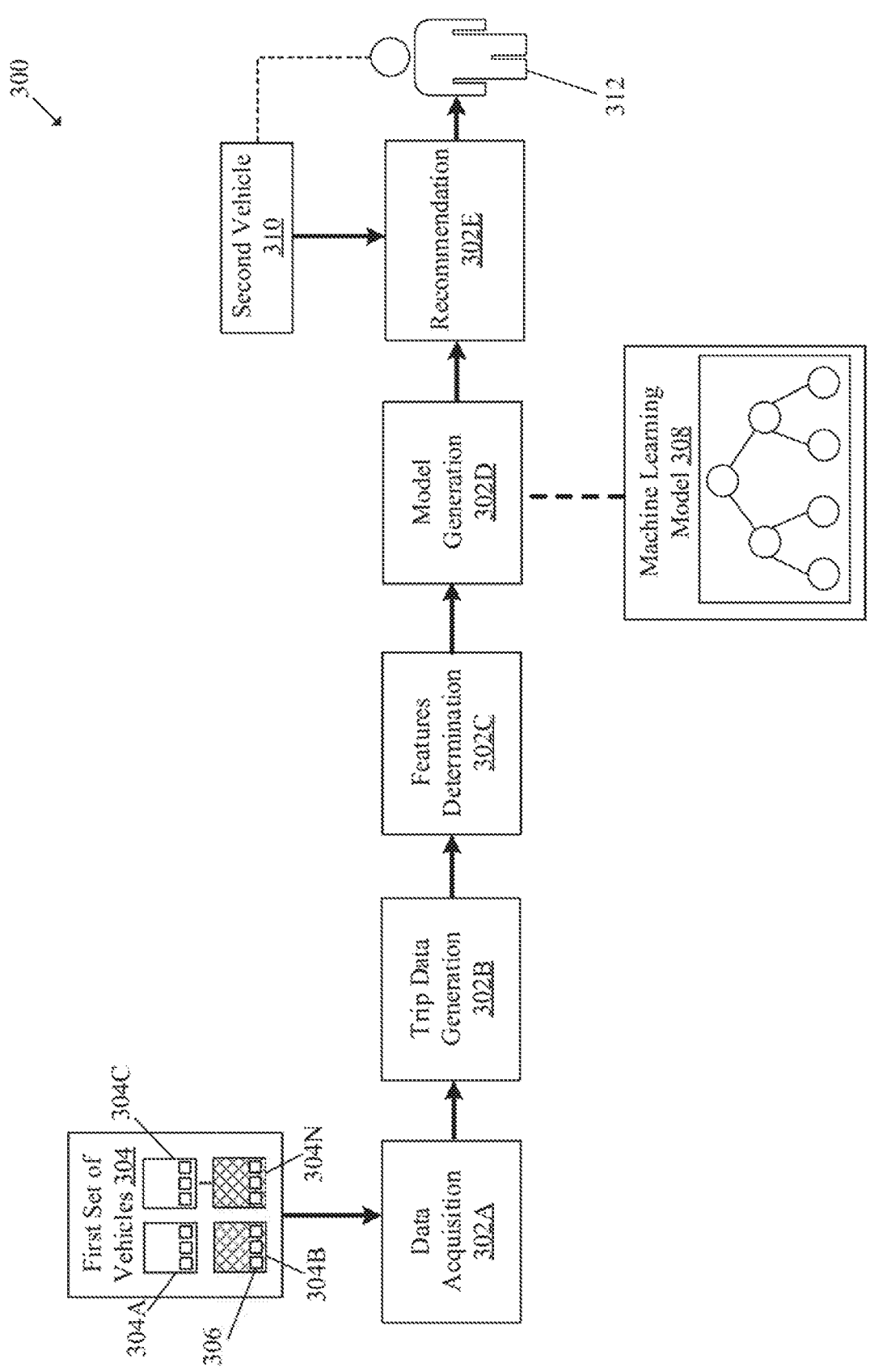
FIG. 3 is a diagram that illustrates exemplary operations for generation of a machine learning model and recommendation of vehicle based on the generated machine learning model, in accordance with an embodiment of the present disclosure.

FIG. 3 is a diagram that illustrates exemplary operations for generation of a machine learning model and recommendation of vehicle based on the generated machine learning model, in accordance with an embodiment of the present disclosure. FIG. 3 is explained in conjunction with elements from FIG. 1 and FIG. 2. There is shown a block diagram 300 of exemplary operations from 302A to 302E performed by the vehicle recommendation device 102 or the circuitry 202.

At 302A, a data acquisition operation may be executed. In the data acquisition operation, the circuitry 202 may be configured to receive vehicle log data from each of a first set of vehicles 304 (for example similar to the first set of vehicles 104 in FIG. 1). The first set of vehicles 304 may be classified based on a set of vehicle types. The first set of vehicles 304 may include a first vehicle 304A, a second vehicle 304B, a third vehicle 304C and an Nth vehicle 304N as shown in FIG. 3. The set of vehicle types may include, but is not limited to, a full hybrid electric vehicles (FHEV's) or a non-full hybrid electric vehicles (non-FHEV's). For example, the first vehicle 304A and the third vehicle 304C may be the full hybrid electric vehicles (FHEV) and the second vehicle 304B and the Nth vehicle 304N may be the non-full hybrid electric vehicles (non-FHEV).

A full hybrid electric vehicle (FHEV) may be a vehicle that may include a conventional gasoline engine and an electric based engine. The FHEV may switch to between electric power and gas engine power to drive the vehicle. A non-full hybrid electric vehicle (non-FHEV) may be a vehicle that includes a conventional gasoline engine. Each vehicle of the first set of vehicles 304 may include a plurality of sensors 306 that may be configured to capture data corresponding to various parameters of the vehicle. The plurality of sensors 306 may include, but not limited to, a location sensor, a real-time clock, a trip computing device, a vehicle speed sensor, an accelerometer, a carbon-emission sensor, a fuel consumption sensor, an engine revolution per minute (RPM) sensor, a temperature sensor, a throttle position sensor, a pressure sensor, or a battery voltage sensor.

In some embodiments, the plurality of sensors 306 may be integrated in each of the first set of vehicles 304. In some other embodiments, the plurality of sensors 306 may be coupled to the first set of vehicles 304. It may be noted here that the position, orientation, arrangement and shape of the plurality of sensors 306 shown in FIG. 3 is presented merely as an example. The present disclosure may be also applicable to other positions, orientations, arrangements, and shape of the plurality of sensors 306, without deviation from the scope of the disclosure.

The plurality of sensors 306 may be configured to capture the vehicle log data corresponding to the first set of vehicles 304. The vehicle log data corresponding to one or more of the first set of vehicles 304 may include, for example, navigation information captured by the navigation sensor at a first timestamp, navigation information at a second timestamp, vehicle speed data from the first timestamp to the second timestamp, fueling data between the first timestamp and the second timestamp, brakes related data, temperature data, or battery data. The first/second timestamp may indicate at which particular date and/or time particular vehicular data may be captured by a particular sensor. In some embodiments, the vehicle log data may be captured by a timestamping unit (TSU) present in the vehicle. In an embodiment, the plurality of sensors 306 may be further configured to transmit the captured vehicle log data to the circuitry 202 of the vehicle recommendation device 102. In some embodiments, an electronic control unit (ECU) of the first set of vehicles 304 may provide the captured vehicle log data to the circuitry 202.

At 302B, a trip data generation operation may be performed. In the trip data generation operation, the circuitry 202 may be configured to generate vehicle trip data corresponding to each vehicle of the first set of vehicles 304. The vehicle trip data may be generated based on the corresponding received vehicle log data. The received vehicle log data may be of a particular time period (for example a few hours, a particular day, a particular week, a particular month, or more). The circuitry 202 may be configured to analyze and process the received vehicle log data to generate the vehicle trip data. For example, the circuitry 202 may be configured to analyze, but is not limited to, the timestamp data, geographical (GPS) data, vehicle speed data, or vehicle fuel data, in the received vehicle log data to determine information about a trip. For example, in case the vehicle log data of the first vehicle 304A indicate that the first vehicle 304A may be present at a first GPS co-ordinates (i.e. first location) at the first timestamp and present at a second GPS co-ordinates (i.e. second location) at the second timestamp, the circuitry 202 may be further configured to determine a first trip of the first vehicle 304A from the first GPS co-ordinates to the second GPS co-ordinates based on the first and second timestamps included in the collected vehicle log data. In some other embodiments, the circuitry 202 may be further configured to determine the average speed of the first vehicle 304A during the first trip based on the vehicle speed data included in the received vehicle log data captured with different timestamps. In some embodiments, the circuitry 202 may be further configured to determine a refueling event during the first trip of the first vehicle 304A based on the vehicle fuel data included in the vehicle log data.

In some other embodiments, the circuitry 202 may be further configured to determine a trip time taken to complete the first trip based on the received vehicle log data. The circuitry 202 may be further configured to determine a dwell time of the first vehicle 304A during the first trip. In an embodiment, the average speed, the trip time, the dwell time, or the refueling events may be part of the vehicle trip data of the first vehicle 304A for the first trip.

The circuitry 202 may be further configured to analyze and process received vehicle log data of the first vehicle 304A to determine plurality of trips associated with the first vehicle 304A in a particular duration (for example in last one month). Similarly, the circuitry 202 may be configured to generate the vehicle trip data for each of the first set of vehicles 304 based on the received vehicle log data associated with each of the first set of vehicles 304.

At 302C, a feature determination operation may be performed. In the feature determination operation, the circuitry 202 may be configured to determine a set of features based on the generated vehicle trip data of each of the first set of vehicles 304. The set of features may be associated with the determined plurality of trips of each of the first set of vehicles 304. For example, the circuitry 202 may be configured to determine the features such as information about refueling (i.e. "refuel_freq" or "refuel_bin") from data about the refueling events (i.e. included in the vehicle trip data) which may be captured by the fuel sensors associated with the first set of vehicles 304. As another example, the number of unique destinations, average trip speed may be determined, as the set of features, from the vehicle speed information present in the vehicle trip data. As another example, a number of trips per month, a number of routine/non-routine trip on a weekday/weekend day, as the set of features, may be determined from the vehicle trip data. In some embodiments, the set of features may be associated with information about the first set of vehicles 304. Examples of the information or such features may include, but are not limited to, a model name, a model year, or a type of vehicle.

The determined set of features may include, but is not limited to, a first subset of features, a second subset of features, and a third subset of features. The first subset of features may indicate a fueling behavior of the first set of vehicles 304. The second subset of features may indicate trip information and routine information associated with the first set of vehicles 304. The third subset of features may indicate the information (for example "model_type", "model_year", or "type of vehicle") about the first set of vehicles 304. Examples of the first subset of features, the second subset of features, and the third subset of features is further described, for example, in Tables 1 and 2.

The fueling behavior of the first vehicle 304A of the first set of vehicles 304 may correspond to a plurality of fueling or refueling events of the first vehicles 304A. The information about the fueling events of the first vehicle 304A may be extracted, as the fueling data, from the vehicle log data captured by the fuel gauge sensors associated with the first vehicle 304A. The information about the fueling events may indicate a level of fuel (for example, petrol, diesel, gas, or electric charge) stored in a fuel tank of the first vehicle 304A at different timestamps or geo-locations. The information about the fueling events may indicate, but is not limited to, an amount of fuels filed during a refueling event, an amount of fuel left at the time of refueling, details of fuel stations, timestamp associated with refueling, an amount of fuel consumed at different plurality of trips associated with the corresponding vehicle (such as first vehicle 304A). The circuitry 202 may be configured to extract the fueling data corresponding to the fueling behavior from the received vehicle log data of the first vehicle 304A. In some embodiments, the fueling data may indicate, but is not limited to, a quantity of fuel filled during the fueling event or a cost of fuel filled during the fueling event.

The circuitry 202 may be further configured to compare the extracted fueling data with a predefined fueling threshold value. The circuitry 202 may be further configured to determine the first subset of features based on the comparison. The fueling threshold value may be a value below which the corresponding fueling events may be discarded for determination of at least one of the first subset of features. For example, if the cost value of refuel during a refueling event is less than $10 (i.e. fueling threshold value), the circuitry 202 may be configured to discard the corresponding refueling event during the calculation of the first sub feature (say "refuel_freq") of the first set of features. The circuitry 202 may be further configured to generate a histogram of the refueling frequency based on the extracted fueling data for each of the first set of vehicles 304. The circuitry 202 may be further configured to determine the at least one of the first subset of features (for example, "refuel_bin") based on a peak refueling value of the generated histogram of refueling frequency. The determination of the at least one of the first subset of features, the histogram of refueling frequency, and the peak refueling value is described in detail, for example, in FIG. 4.

In an embodiment, the second subset of features may indicate the trip information and the routine information associated with each of the first set of vehicles 304. The circuitry 202 may be configured to generate the trip information and the routine information as the vehicle trip data of each of the first set of vehicles 304. The trip information and the routing information may be generated based received vehicle log data of the first vehicle 304A of the first set of vehicles 304. In some embodiments, the trip information may be generated based on navigation information and speed information captured by the navigation sensor, the engine speed sensor, and the vehicle speed sensor. By the way of an example, the navigation information may include GPS co-ordinates of the locations where the vehicle (for example the first vehicle 304A) has travelled. The trip information may include information about mileage of vehicle, refueling frequency, average trip speed, dwell time, or number/location of stops during a particular trip. The routine information may correspond to information about a routine destination visited by the first vehicle 304A and may be generated based on the data captured by the navigation or location sensor. A location may be considered as the routine destination for the first vehicle 304A in case the first vehicle 304A travels to a particular destination more than a specific number of times (i.e. routine threshold) in a particular time interval (for example in last one month). For example, if the vehicle log data includes GPS co-ordinates of a particular location (say office of a user associated with the first vehicle 304A) for more than 10 number of times in a particular month, the particular location may be considered as the routine destination for the first vehicle 304A. In some other embodiments, the circuitry 202 may be further configured to generate the routine information based on the vehicle trip data corresponding to the particular destination. By the way of example, if the user of one of the first vehicle 304A visits office (i.e. destination location) regularly, the vehicle trip data corresponding to office may include, but is not limited to, the distance to office from home, the fuel utilized during the trip, the number of times user went to the office, etc.

In an embodiment, the circuitry 202 may be further configured to determine the third subset of features of the set of features. The third subset of features may indicate the information about each of the first set of vehicles 304. For example, the information about the first vehicle 304A may indicate, but is not limited to, a model type of the first vehicle 304A, a model year of the first vehicle 304A, a type of the vehicle. In an embodiment, the third set of features may be determined from the server 112. The server 112 may be configured to store an electronic customer relationship management (eCRM) database. The eCRM database that may store the information about the vehicles (for example the first vehicle 304A) sold by a particular organization. The circuitry 202 may be configured to transmit vehicle identification information associated with each of the first set of vehicles 304 to the server 112 to determine the third set of features. The vehicle identification information may correspond to at least one of a vehicle registration number, an engine number, a chassis number, or a combination of the vehicle registration number, the engine number, and the chassis number. The server 112 may be configured to receive the vehicle identification information, search stored records corresponding to the received vehicle identification information, and further transmit the information (i.e. third set of features) about the first set of vehicles 304 to the circuitry 202. The circuitry 202 may be further configured to receive the transmitted information about each of the first set of vehicles from the server 112.

In some embodiments, circuitry 202 may dynamically determine the set of features based on the vehicle log data gathered by the plurality of sensors 306 on run-time basis. In some other embodiments, the set of features may be pre-defined and the values for the corresponding pre-defined features for each vehicle of the first set of vehicles 304 may be determined based on the corresponding vehicle log data captured by the plurality of sensor 306 of the first set of vehicles 304. Examples of pre-defined set of features and corresponding definition is provided, as follows in Table 1:

TABLE 1

Definition of the set of features

| S.No. | Pre-defined Features | Definition |
|---|---|---|
| 1. | refuel_bin | Remaining mileage bin at peak refueling frequency in the refueling frequency histogram |
| 2. | refuel_freq | Peak frequency count of refueling cycle |
| 3. | mile_d_freq | Total mileage/refuel_freq |
| 4. | num_routine_dest | Number of routine destination |
| 5. | num_unique_dest | Number of unique destination |
| 6. | trips_per_driving_month | Number of trips/months with trip |
| 7. | avg_trip_speed | Average of trip speed |
| 8. | routine_mileage | Total of routine mileage |
| 9. | non_routine_mileage | Total mileage of non-routine trips |
| 10. | num_nr_wd_index | Number of non-routine trips on a weekday/total mileage |
| 11. | avg_trip_mileage | Total mileage/number of trips |
| 12. | avg_daily_duration | Total duration/number of days with trips |
| 13. | num_r_wd_index | Number of routine trips on a weekday/total mileage |
| 14. | avg_trip_dwell | Total dwell/number of trips |
| 15. | avg_trip_duration | Total duration/number of trips |
| 16. | trips_per_driving_day | Number of trips/number of days with trip |
| 17. | trip_this_month | Number of trips within the last month |
| 18. | avg_daily_mileage | Total mileage/number of days with trip |
| 19. | trip_two_month_earlier | Number of trips within the third to the last month |
| 20. | num_r_wn_index | Number of routine trips on a weekend/total mileage |
| 21. | trip_one_month_earlier | Number of trips within the second to the last month |
| 22. | num_nr_wn_index | Number of non-routine trips on a weekend/total mileage |
| 23. | uniq_dest_one_month_earlier | Number of unique destinations within the second to the last month |
| 24. | model_type | Type of the model |
| 25. | model_year | Registration year of model |
| 26. | Zipcode | Zipcode of city in which the owner is living/driving the vehicle |
| 27. | own_or_not | Vehicle owned or not |
| 28. | lt_or_not | Light Truck or not |
| 29. | days_ownership | No. of years since vehicle is owned |

With reference to Table 1, the set of features may contain twenty-nine (29) features. The twenty-nine (29) number of features shown in Table 1 is presented merely as an example. The set of features may include only one or more than N features for the purpose of machine learning based recommendation of vehicle, without deviation from the scope of the disclosure.

Each feature of the set of features may be determined based on the generated vehicle trip data, the vehicle log data, and the information about the first vehicle 304A. Each feature of the set of features may be categorized into one of the first subset of features, the second subset of features and the third subset of features. The circuitry 202 may be further configured to associate a weight parameter with each of the set of features. The associated weight parameter may correspond a significance or importance factor of the corresponding feature in generation of the machine learning (ML) model 308. The generated ML model 308 may be trained to output a first type of vehicle from the first set of vehicles 304. The circuitry 202 may be further configured to recommend the type of vehicle to a user based on the output of the generated ML model 308. For example, with reference to Table 1, the set of features along with their corresponding weight parameter are presented in Table 2, as follows:

TABLE 2

Set of features with associated weight parameters

| Subset | Features in Subset | Weight Parameter |
|---|---|---|
| First Subset | refuel_bin | 0.133 |
| | refuel_freq | 0.052 |
| | mile_d_freq | 0.026 |
| Second Subset | num_routine_dest | 0.076 |
| | num_unique_dest | 0.030 |
| | trips_per_driving_month | 0.029 |
| | avg_trip_speed | 0.028 |
| | routine_mileage | 0.026 |
| | non_routine_mileage | 0.025 |
| | num_nr_wd_index | 0.025 |
| | avg_trip_mileage | 0.021 |
| | avg_daily_duration | 0.019 |
| | num_r_wd_index | 0.019 |
| | avg_trip_dwell | 0.017 |
| | avg_trip_duration | 0.017 |
| | trips_per_driving_day | 0.016 |
| | trip_this_month | 0.016 |
| | avg_daily_mileage | 0.015 |
| | trip_two_month_earlier | 0.015 |
| | num_r_wn_index | 0.015 |
| | trip_one_month_earlier | 0.014 |
| | num_nr_wn_index | 0.012 |
| | uniq_dest_one_month_earlier | 0.011 |
| Third Subset | model_type | 0.104 |
| | model_year | 0.085 |
| | Zipcode | 0.049 |
| | own_or_not | 0.032 |
| | lt_or_not | 0.011 |
| | days_ownership | 0.064 |

It may be noted here that the classification of the set of features in the first subset, the second subset and the third subset, and the corresponding weight parameter shown in Table. 2. is presented merely as an example. The present disclosure may have more or less number of features in the first subset, the second subset and the third subset, and different values of the weight parameters, without deviation from the scope of the disclosure.

With reference to Table 1 and Table 2, the weight parameter of each feature may be predefined or may be based on an importance of the corresponding feature. In an embodiment, the features that may have weights that may be tending towards or closer to 1.0 may be more important as compared to other features that may have score that may be close to 0. For example, the "refuel_freq" feature may correspond to the peak frequency count (or peak refueling frequency value) of the refueling cycle of the first vehicle 304A. For example, the "refuel_freq" feature may be determined based on the vehicle log data captured by the fuel senor associated with the first vehicle 304A. As another example, the "refuel_bin" feature may correspond to remaining mileage bin at peak refueling frequency in the refueling frequency histogram. For example, the "refuel_bin" feature may indicate when the first vehicle 304A is refueled more often when the remaining mileage is low. The "refuel_bin" feature may be more important than the "refuel_freq" feature and the weight parameter associated with the "refuel_bin" feature may be greater than the weight parameter associated with the "refuel_freq" feature as shown in Table 2. The determination of the "refuel_bin" and "refuel_freq" features are described in detail, for example, in FIG. 4. In an embodiment, the mileage of the vehicle (for example the first vehicle 30A) may correspond to the distance (in kilometers or miles) that the vehicle can cover with the current fuel or gas present in the fuel tank.

As another example, the "avg_trip_speed" may correspond to the average speed of the first vehicle 304A captured during the plurality of trips done by the first vehicle 304A. The "num_routine_dest" may correspond to the number of routine destinations of the first vehicle 304A. In an embodiment, the "num_routine_dest" may be more important than the "avg_trip_speed" feature, as shown in Table 2, for example.

As another example, the "zipcode" feature may correspond to the zipcode of the area/region in which the first vehicle 304A may be currently present or located. "Zipcode" feature may be helpful in providing information about popularity (i.e. liking or disliking of vehicles) of the vehicle manufacturer in a particular region and hence may be included in the set of features. For example, if vehicle brand "A" is popular in city area, it may not be popular in coastal areas, and hence the "zipcode" feature may be of more importance than the "lt_or_not" feature (i.e. indicate whether the first vehicle 304A is a light truck or not) as shown in Table 2.

At 302D, model generation operation may be performed. In model generation operation, the circuitry 202 may be configured to generate the ML model 308. The generated ML model 308 may be trained based on the determined set of features (for example as shown in Tables 1 and 2). In some embodiments, the generated ML model 308 may be trained to output a first type of vehicle from the set of vehicle types. In some other embodiments, the generated ML model 308 may be trained based on the weight parameter associated with each feature of the set of features to output the first type of vehicle from the set of vehicles. For example, the first type may include, but is not limited to, a FHEV vehicle or a non-FHEV vehicle.

Functions and/or an operational configuration of the ML model 308 may be same as the functions and/or the operational configuration of the ML model 108, as described, for example, in FIG. 1. Therefore, further description of the ML model 308 is omitted from the disclosure for the sake of brevity.

In some embodiments, the ML model 308 may be trained to output a final value. The circuitry 202 may be configured to compare the final value with a predefined threshold value. The circuitry 202 may be further configured to control the ML model 308 to output the first type of vehicle from the set of vehicle types based on the comparison. In an embodiment, in case, the final value output from the ML model 308 is greater than the predefined threshold value, the circuitry 202 may be configured to control the ML model 308 to output the first type of vehicle (for example FHEV). In some other embodiments, in case, the final value is lesser than or equal to the predefined threshold value, the circuitry 202 may be configured to control the ML model 308 to output the second type of vehicle (i.e. non-FHEV). By the way of an example, the value of the predefined threshold may be "0.". If the final value of the ML model 308 is less than or equal to "0", the circuitry 202 may be configured to control the ML model 308 to output non-full hybrid electric vehicle (non-FHEV) type of vehicle. If the final value of the ML model 308 is greater than "0", the circuitry 202 may be configured to control the ML model 308 to output full hybrid electric vehicle (FHEV) type of vehicle.

The generated ML model 308 may be a binary classification model. The binary classification model may classify the given set of elements into two groups where a first group may correspond to the first type of vehicle and the second group may correspond to the second type of vehicle. For example, the generated ML model 308 may be based on a random forest method. The detailed implementation of the aforementioned technique (i.e. random forest method) may be known to one skilled in the art, and therefore, a detailed description for the aforementioned technique has been omitted from the disclosure for the sake of brevity. Examples of other types of algorithms for implementation of binary classification model may include, but not limited to, decision trees, Bayesian networks, support vector machines, neural networks, deep learning models, logistic regressions, or Probit model.

At 302E, a recommendation operation may be performed. In recommendation operation, the circuitry 202 may be configured to receive a set of values associated with the set of features from a second vehicle 310. The second vehicle 310 may be associated with the user 312 and may be different from the first set of vehicles 304 based on which the ML model 308 may be trained. The user 312 may be a customer who may be looking to purchase a new vehicle. In some other embodiments, the user 312 may be an individual who has not purchased a new vehicle in a particular time period (say for example, from last 5 years) and may be a potential target customer for a manufacturing or sales organization of a particular vehicle. In some embodiments, the circuitry 202 may be configured to receive the set of values, from the user 312, via, the I/O device 206. The set of values may be information regarding the corresponding set of features on which the ML model 308 may be trained. For example, the set of values may indicate a model number of the second vehicle 310 which may be related to the "model_type" feature. In another example, the received set of values may indicate a value of refueling frequency of the second vehicle 310 which may be related to the "refuel_freq" feature. Thus, the received set of values (i.e. related to the second vehicle 310 or the user 312) may correspond on one or more features on which the ML model 308 has been trained based on the first set of vehicles 304.

In some other embodiments, the circuitry 202 may be configured to receive a first vehicle log data (i.e. real-time vehicle data) from the second vehicle 310, as the set of values. The first vehicle log data of the second vehicle 310 may be similar to the vehicle log data of one or more of the first set of vehicles 304. The circuitry 202 may be further configured to generate values corresponding to each feature of the set of features based on the received first vehicle log data of the second vehicle 310. In some embodiments, the circuitry 202 may be further configured to transmit an identification information of the second vehicle to the server 112 and receive information (for example, but is not limited to, vehicle log data) about the second vehicle 310 from the server 112 based on the identification information of the second vehicle 310.

The circuitry 202 may be further configured to apply the generated ML model 308 on the received set of values associated with the set of features for the second vehicle 310. The circuitry 202 may be further configured to control the generated ML model 308 to output the final value based on the application of the generated ML model 308 on the received set of values. In some embodiments, the circuitry 202 may be configured to apply the weight parameter of the set of features to the corresponding received set of values of the second vehicle 310 and output the final value based on the application of the weight parameter. For example, the circuitry 202 may calculate the final value of the ML model 308 based on the weighted average of the dot product of the received set of values and the corresponding weight parameter of the set of features. The circuitry 202 may be further configured to compare the output final value with the predefined threshold value (for example zero value). Based on the result of the comparison, the first type of vehicle or the second type of vehicle from the set of vehicle types may be recommended to the user 312 associated with the second vehicle 310. The first type of vehicle or the second type of vehicle may be one of a FHEV or Non-FHEV. The circuitry 202 may be configured to control the I/O device 206 to output the recommended first type or second type of the vehicle for the user 312.

With reference to table 2, it may be noted that the weight parameters associated with the first subset of features may be higher than the second subset of feature and the third subset of features. As the generated ML model 308 may recommend, for example, one of FHEV or Non-FHEV, it may be assumed that of if the user 312 is less cautious about the re-fueling the second vehicle 310, the non-FHEV type may be recommended and if the user 312 is more cautious about the re-fueling the second vehicle 310, then FHEV type may be recommended by the disclosed vehicle recommendation device 102 based on the trained ML model 308. For example, in case, the set of values indicate that the second vehicle 310 is of a particular model type (say FHEV), then the circuitry 202 may recommend the first type of vehicle as FHEV again, since the weight parameter of the "model_type" feature may be higher than other features in the third subset of features, as shown in Table 2. As another example, in case, one of the set of values corresponding to "zipcode" feature indicate a region where the user 312 drives the second vehicle 310 and a particular vehicle manufacturer is famous in the same region, then the circuitry 202 may recommend premium vehicles of a particular segment (FHEV or Non-FHEV) of the vehicle manufacture to the user 312.

Therefore, the trained machine learning (ML) model 308 of the disclosed vehicle recommendation device 102 may be used to recommend vehicle type (first type or second type) to the user 312, based on the information (for example set of values, trip data, fueling behavior, or sensor data) received about the second vehicle 310 associated with the user 312. The trained ML model 308 may provide more accurate recommendation of the vehicle type to the customer or the user 312 of the second vehicle 310, as compared to human recommendation that may be subjective, biased, or less accurate.

Figure 4:
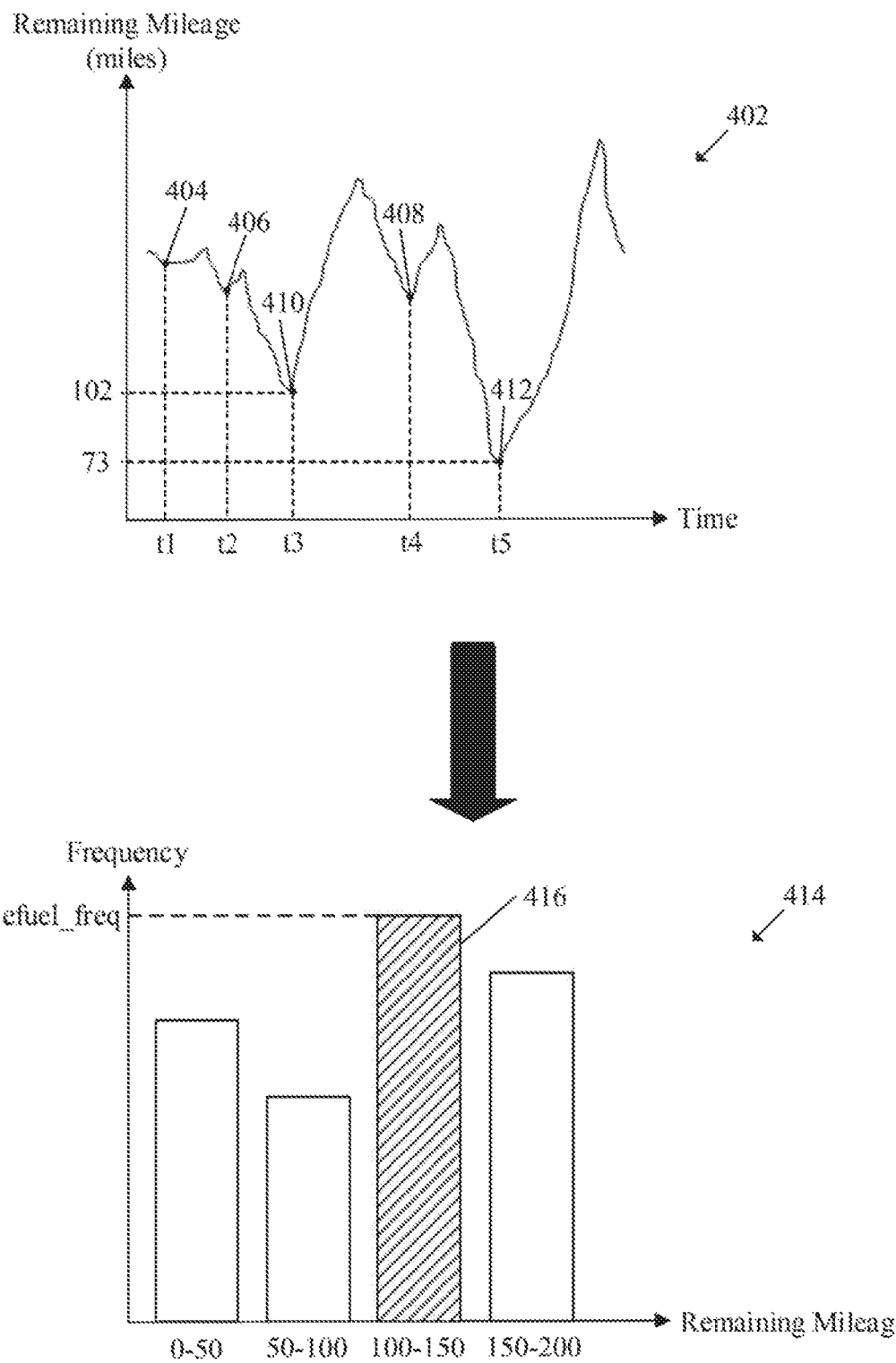
FIG. 4 is a diagram that illustrates an exemplary scenario for determination of a set of features from vehicle log data associated with an exemplary vehicle, in accordance with an embodiment of the present disclosure.

FIG. 4 is a diagram that illustrates an exemplary scenario for determination of a set of features from vehicle log data associated with an exemplary vehicle, in accordance with an embodiment of the present disclosure. FIG. 4 is explained in conjunction with elements from FIG. 1, FIG. 2, and FIG. 3. There is shown an exemplary trip scenario of an exemplary vehicle trip data which may be generated based on the vehicle log data of the first vehicle 304A from the first set of vehicles 304. For example, there is shown (in a form of a graph 402), the vehicle trip data related to the fueling behavior of the first vehicle 304A. The vehicle trip data related to the fueling behavior (as shown in the graph 402) may be generated by the circuitry 202 based on the vehicle log data gathered from the fuel gauge sensor and/or the fuel temperature sensor associated with the first vehicle 304A.

The circuitry 202 may be configured to receive the vehicle log data related to the first vehicle 304A from the plurality of sensors 306 associated with the first vehicle 304A of the first set of vehicles 304. The vehicle log data may include the fueling or re-fueling data indicating the fueling behavior of the first vehicle 304A. The fueling data may correspond to one or more fueling events of the first vehicle 304A during the first trip of the first vehicle 304A. An event may be considered as the fueling event, when the first vehicle 304A is refueled. In some embodiments, the fueling data may include information about the quantity of the fuel filled in the first vehicle 304A during each fueling event of a plurality of fueling events. In some embodiments, the fueling data may include information about the cost of the fuel filled in the first vehicle 304A during each fueling event of the plurality of fueling events. In some other embodiments, the circuitry 202 may be further configured to calculate the cost of fuel filled during each fueling event of the plurality of fueling events. The cost of fuel filled may be calculated, as given by equation (1)

$$\text{Cost} = \frac{(\text{Final Fuel Reading} - \text{Initial Fuel Reading})}{\text{Cost of fuel per liter}} \quad (1)$$

The circuitry 202 may be further configured to generate the vehicle trip data based on the vehicle log data of the first vehicle 304A. As an example, the generated vehicle trip data may indicate values represented in the graph 402. As shown in FIG. 4, the graph 402 is between the remaining mileage of the first vehicle 304A and the time. The remaining mileage may correspond to the distance (in miles or Kilometers) that the first vehicle 304A can cover with the remaining fuel left in the fuel tank of the first vehicle 304A. Alternatively, the remaining mileage may indicate, at how much remaining mileage, the first vehicle 304A is refueled.

The circuitry 202 may be further configured to compare the extracted fueling data with a predefined fueling threshold value. The predefined fueling threshold value may correspond to a value below which if the first vehicle 304A is fueled, the fueling event or the fueling data in the vehicle log data may be discarded. In some embodiments, the predefined fueling threshold value may be related to the quantity of fuel filled. In some other embodiments, the predefined fueling threshold value may be related to the cost of the fuel filled in the fueling event. For example, if the predefined fueling threshold value is one liter, then the fueling events in which the filled fuel was less than one liter may be discarded. As another example, if the predefined fueling threshold value is ten dollar cost, any fueling event in which less than ten dollar cost fuel was filled, the circuitry 202 may be configured to discard the corresponding fueling event determination of the set of features related to fueling. For example, the fueling events at time t1, t2 and t4 shown in the graph 402 may be considered as discarded fueling events 404, 406 and 408 because filled fuel is lesser that the predefined fueling threshold value. As another example shown in the graph 402, the fueling events at time t3 and t5 may be referred as the considered fueling events 410 and 412, respectively and may be further considered by the circuitry 202 for the determination of the set of features (for example "refuel_freq" feature, "refuel_bin" feature or "mile_d_freq" feature as shown in Tables 1 and 2). It may be noted that the fueling events may be discarded to filter out minor variations in the fueling behavior due to the predefined fueling threshold value that may impact the determination of values of the first subset of features.

In accordance with an embodiment, the circuitry 202 may be further configured to determine at least one of the first subset of features (for example, but is not limited to, "refuel_bin" feature, "refuel_freq" feature) based on the vehicle trip data (for example, but is not limited to, fueling events). In an embodiment, the circuitry 202 may be further configured to generate a histogram 414 (shown in FIG. 4) of refueling frequency based on the extracted fueling data (i.e. vehicle log data) for the first vehicle 304A. In some other embodiments, the circuitry 202 may be further configured to generate the histogram 414 of the refueling frequency based on the vehicle trip data as shown by the graph 402. The histogram 414 may be generated between the remaining mileage of the first vehicle 304A and the frequency of fueling. The histogram 414 may include a number of bins (or buckets) that may have a fixed width. For example, as shown in FIG. 4, the histogram 414 may have four bins with width of 50 units (i.e. miles). The circuitry 202 may be further configured to determine a peak bin 416 from the bins of the histogram 414. The peak bin 416 may be a bin that may have the highest value for frequency of the fueling. The value corresponding to the peak bin 416 may be the value for the feature "refuel_freq" of the first subset of features. The circuitry 202 may be further configured to determine a range of the width of the peak bin 416 (for example 100-150 miles as shown in FIG. 4). The circuitry 202 may be further configured to calculate an average value of the range of the width at the peak bin 416. The average value of the remaining mileage range at the peak refueling frequency may be a value for the "refuel_bin" feature of the first subset of the features shown in Tables 1 and 2.

By the way of example, if a user of the first vehicle 304A is more cautious about the refueling of the first vehicle 304A, the value of "refuel_bin" feature may be high. For example, from the peak bin 416, if the value of "refuel_bin" feature is high (say 125), then the circuitry 202 may be configured to train the ML model 308 to output or recommend a FHEV as the first vehicle 304A may be refueled at higher remaining mileage. By the way of another example, if the user of the first vehicle 304A is less cautions about refueling of the first vehicle 304A, the value of "refuel_bin" feature may be low and the circuitry 202 may be configured to train the ML model 308 to output or recommend a non-FHEV for the first vehicle 304A with lower refueling remaining mileage.

In similar fashion, if the refueling remaining mileage of the second vehicle 310 is high (as indicated by the received set of values), then the trained ML model 308 may recommend a FHEV to the user 312 of the second vehicle 310 as the user 312 may be more cautious about the refueling of the second vehicle 310. In another case, if the refueling remaining mileage of the second vehicle 301 is low (as indicated by the received set of values), then the trained ML model 308 may recommend a non-FHEV to the user 312 of the second vehicle 310 as the user 312 may be less cautious about the refueling of the second vehicle 310.

In some embodiments, the circuitry 202 may be further configured to determine a value of the "mile_d_freq" feature included in the first subset of features. The "mile_d_freq" feature may be calculated, as given by equation (2)

$$\text{mile\_d\_freq} = \frac{\text{Total trip mileage}}{\text{refuel\_freq}} \qquad (2)$$

In an embodiment, the circuitry 202 may be further configured to determine the values for each feature of the second subset and the third subset of features. The circuitry 202 may be further configured to generate the ML model 308 based on the determined values for the set of features. The circuitry may be further configured to receive the set of values for each feature associated with the second vehicle 310 and apply the generated ML model 308 on the received set of values to recommend the first type or the second type of vehicle to the user 312 as described, for example, in recommendation step 302E of FIG. 3.

In some embodiments, the circuitry 202 may be configured to receive vehicle log data associated with the second vehicle 310. The circuitry 202 may be further configured to generate the vehicle trip data based on the received vehicle log data and determine the set of features associated with the second vehicle 310. The circuitry 202 may be further configured to determine values for each of the determined set of features for the second vehicle 310 and apply the generated ML model 308 to recommend the first type or the second type of vehicle to the user 312.

Figure 5:
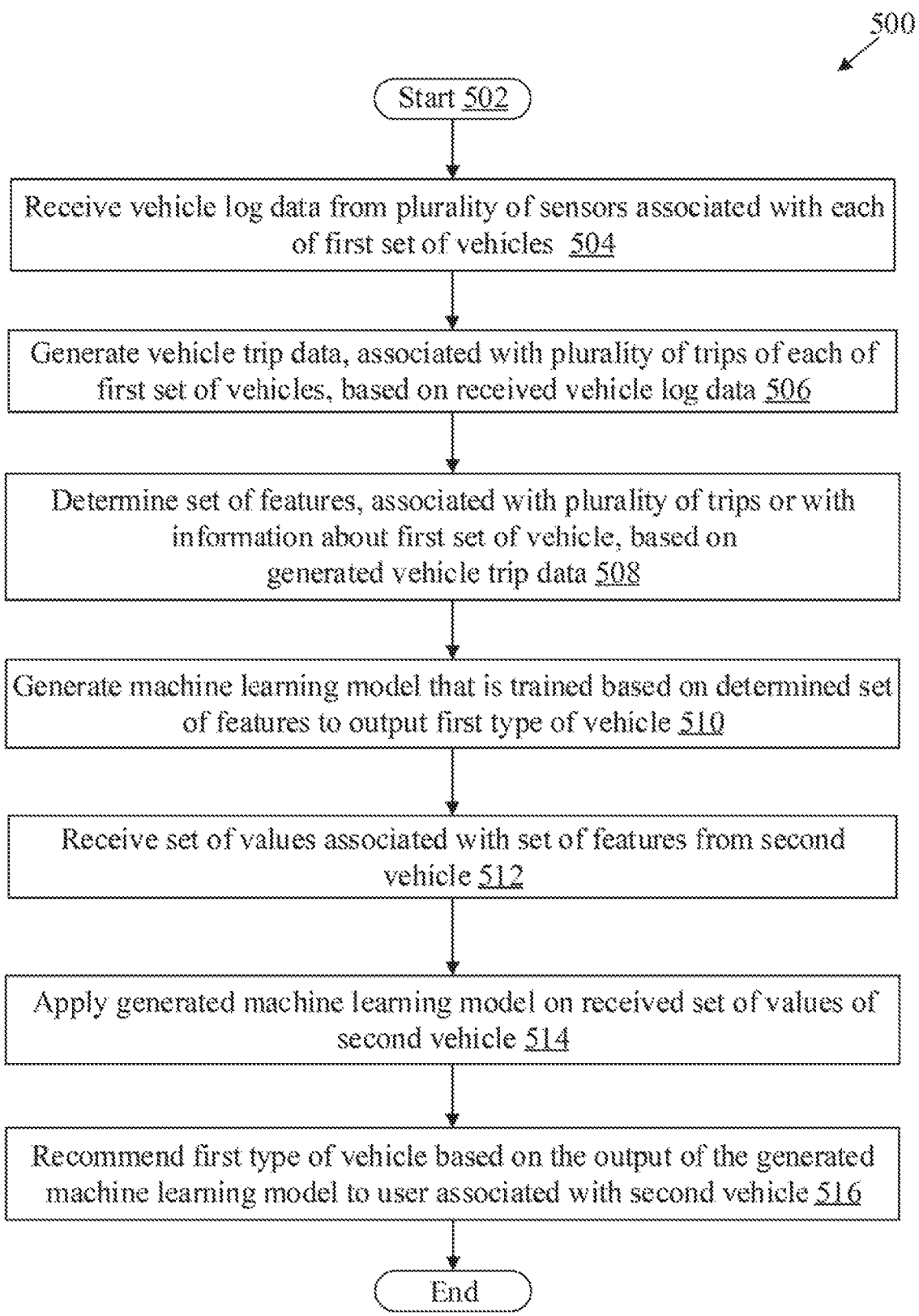
FIG. 5 is a flowchart that illustrates exemplary operations for machine learning based recommendation of vehicle, in accordance with an embodiment of the present disclosure.

FIG. 5 is a flowchart that illustrates exemplary operations for machine learning based recommendation of vehicle, in accordance with an embodiment of the disclosure. With reference to FIG. 5, there is shown a flowchart 500. The flowchart 500 is described in conjunction with FIGS. 1, 2, 3, and 4. The operations from 502 to 516 may be implemented, for example, by the vehicle recommendation device 102 of FIG. 2 or the circuitry 202 of FIG. 2. The operations of the flowchart 500 may start at 502 and proceed to 504.

At 504, vehicle log data for each of the first set of vehicles 104 may be received from the plurality of sensors 106 associated with each of the first set of vehicles 104. The first set of vehicles 104 may be classified based on a set of vehicle types. In accordance with an embodiment, the vehicle recommendation device 102 or the circuitry 202 may be configured to receive the vehicle log data from the plurality of sensors 106 (or the plurality of sensors 306) associated with each of the first set of vehicles 104 where the first set of vehicles 104 may be classified based on the set of vehicle types as described, for example, in FIGS. 1 and 3.

At 506, vehicle trip data, associated with a plurality of trips of each of the first set of vehicles 104, may be generated based on the received vehicle log data. In accordance with an embodiment, the vehicle recommendation device 102 or the circuitry 202 may be configured to generate the vehicle trip data (i.e. associated with the plurality of trips of each of the first set of vehicles 104) based on the received vehicle log data as described, for example, in FIG. 3.

At 508, a set of features, associated with the plurality of trips or with information about the first set of vehicles 104, may be determined based on the generated vehicle trip data. In accordance with an embodiment, the vehicle recommendation device 102 or the circuitry 202 may be configured to determine the set of features (i.e. associated with the plurality of trips or with information about the first set of vehicles 104) based on the generated vehicle trip data, as described, for example, in FIG. 3.

At 510, a machine learning model 108 may be generated. The generated machine learning model 108 may be trained based on the determined set of features to output a first type of vehicles from the set of vehicles types. In accordance with an embodiment, the vehicle recommendation device 102 or the circuitry 202 may be configured to generate the machine learning model 108 (or the ML model 308) which is trained based on the determined set of features to output the first type of vehicle from the set of vehicle types (for example FHEV or non-FHEV), as described, for example, in FIGS. 1 and 3.

At 512, a set of values associated with the set of features may be received from a second vehicle 110. The second vehicle 110 may be different from the first set of vehicles 104 on which the machine learning model 108 may be generated. In accordance with an embodiment, the vehicle recommendation device 102 or the circuitry 202 may be configured to receive the set of values (i.e. associated with the set of features) from the second vehicle 110, as described, for example, in FIG. 3.

At 514, the generated machine learning model 108 may be applied on the received set of values of the second vehicle 110. In accordance with an embodiment, the vehicle recommendation device 102 or the circuitry 202 may be configured to apply the generated machine learning model 108 on the received set of values of the second vehicle 110, as described, for example, in FIG. 3.

At 516, the first type of vehicle may be recommended to a user, associated with the second vehicle 110, based on the output of the generated machine learning model 108. The user (for example the user 312) may be associated with the second vehicle 110. In accordance with an embodiment, the vehicle recommendation device 102 or the circuitry 202 may be configured to recommend the first type of vehicle (for example FHEV) or the second type of vehicle (for example non-FHEV) based on the output of the generated machine learning model 108 to the user 312 associated with the second vehicle 110, as described, for example, in FIG. 3. Control may further pass to end.

Various embodiments of the disclosure may provide a non-transitory, computer-readable medium and/or storage medium, and/or a non-transitory machine readable medium and/or storage medium stored thereon, a set of instructions executable by a machine and/or a computer for machine learning based recommendation of the vehicle. The set of instructions may be executable by the machine and/or the computer to perform operations that may include receiving vehicle log data from a plurality of sensors associated with each of a first set of vehicles. The first set of vehicles may be classified based on a set of vehicle types. The operations may further include generating vehicle trip data associated with a plurality of trips of each of the first set of vehicles. The vehicle trip data may be generated based on the received vehicle log data. The operations may further include determining a set of features associated with the plurality of trips or with information about the first set of vehicles. The set of features may be determined based on the generated vehicle trip data. The operations may further include generating a machine learning model that may be trained based on the determined set of features to output a first type of vehicle from the set of vehicle type.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A vehicle recommendation device, comprising:
   circuitry configured to:
   receive vehicle log data from a plurality of sensors associated with each of a first set of vehicles, wherein the first set of vehicles are classified based on a set of vehicle types;
   generate vehicle trip data, associated with a plurality of trips of each of the first set of vehicles, based on the received vehicle log data, wherein the vehicle trip data includes information of a plurality of refueling events of the first set of vehicles;
   determine a set of features, associated with the plurality of trips or with information about the first set of vehicles, based on the generated vehicle trip data, wherein
   the set of features comprises a first subset of features,
   the first subset of features indicates a fueling behavior of the first set of vehicles corresponding to the plurality of refueling events of the first set of vehicles, and
   the first subset of features includes a remaining mileage range at which a refueling frequency is the highest for each of the first set of vehicles, and a value of the refueling frequency; and
   generate a machine learning model which is trained based on the determined set of features to output a first type of vehicle from the set of vehicle types.

2. The vehicle recommendation device according to claim 1, wherein the set of vehicle types comprises one of: a full hybrid electric vehicle (FHEV) or a non-full hybrid electric vehicle (non-FHEV).

3. The vehicle recommendation device according to claim 1, wherein the circuitry is further configured to:
   receive a set of values associated with the set of features from a second vehicle, wherein the second vehicle is different from the first set of vehicles based on which the machine learning model is generated;
   apply the generated machine learning model on the received set of values of the second vehicle; and
   recommend the first type of vehicle based on the output of the generated machine learning model to a user associated with the second vehicle.

4. The vehicle recommendation device according to claim 3, wherein the circuitry is further configured to:
   control the generated machine learning model to output a final value based on the application of the generated machine learning model on the received set of values of the second vehicle;
   compare the output final value with a threshold value, wherein the threshold value is a value that differentiates a class of the first type of vehicle from a class of a second type of vehicle in the set of vehicle types;
   recommend the first type of vehicle in a case where the output final value is below the threshold value; and
   recommend the second type of vehicle in a case where the output final value is equal to or above the threshold value, wherein the recommended first type of vehicle is one of a full hybrid electric vehicle (FHEV), a Non-full hybrid electric vehicle (Non-FHEV) or other types of vehicles, wherein the other types of vehicles include a micro hybrid electric vehicles (S&S), a mild hybrid electric vehicles (MHEV), and a Plug-in hybrid electric vehicles (PHEV).

5. The vehicle recommendation device according to claim 1, wherein the circuitry is further configured to:
   associate a weight parameter with each feature of the set of features; and
   generate the machine learning model which is trained based on the weight parameter associated with each feature of the set of features to output the first type of vehicle from the set of vehicle types.

6. The vehicle recommendation device according to claim 1, wherein the plurality of sensors comprises one of an engine speed sensor, a vehicle speed sensor, a fuel gauge sensor, a temperature sensor, a navigation sensor, a real-time clock, a throttle position sensor, or a battery sensor.

7. The vehicle recommendation device according to claim 1, wherein
   the set of features further comprises a second subset of features and a third subset of features
   the second subset of features indicate trip information and routine information associated with the first set of vehicles, and
   the third subset of features indicate the information about the first set of vehicles.

8. The vehicle recommendation device according to claim 7, wherein the circuitry is further configured to generate the trip information and the routine information, as the vehicle trip data, based on navigation information and speed information captured as the vehicle log data from the plurality of sensors.

9. The vehicle recommendation device according to claim 7, wherein the circuitry is further configured to:
   extract fueling data corresponding to the fueling behavior from the received vehicle log data for each of the first set of vehicles, wherein the fueling data indicates one of: a quantity of fuel or a cost of fuel, filled during a fueling event;
   compare the extracted fueling data with a fueling threshold value; and
   determine at least one of the first subset of features based on the comparison.

10. The vehicle recommendation device according to claim 9, wherein the circuitry is further configured to:

generate a histogram between the remaining mileage range and the refueling frequency based on the extracted fueling data for each of the first set of vehicles; and determine the at least one of the first subset of features based on a peak refueling value of the generated histogram of the refueling frequency.

11. The vehicle recommendation device according to claim 1, wherein the circuitry is further configured to:

transmit vehicle identification information associated with the first set of vehicles to a server; and receive the information about the first set of vehicles from the server based on the transmitted vehicle identification information.

12. The vehicle recommendation device according to claim 1, wherein the generated machine learning model is a binary classification model which is further based on one of a random forest algorithm, decision trees, Bayesian networks, support vector machines, neural networks, deep learning models, logistic regressions, or Probit model.

13. A method, comprising:

in a vehicle recommendation device:

receiving vehicle log data from a plurality of sensors associated with each of a first set of vehicles, wherein the first set of vehicles are classified based on a set of vehicle types;

generating vehicle trip data, associated with a plurality of trips of each of the first set of vehicles, based on the received vehicle log data, wherein the vehicle trip data includes information of a plurality of refueling events of the first set of vehicles;

determining a set of features, associated with the plurality of trips or with information about the first set of vehicles, based on the generated vehicle trip data, wherein the set of features comprises a first subset of features, the first subset of features indicates a fueling behavior of the first set of vehicles corresponding to the plurality of refueling events of the first set of vehicles, and the first subset of features includes a remaining mileage range at which a refueling frequency is the highest for each of the first set of vehicles, and a value of the refueling frequency; and generating a machine learning model which is trained based on the determined set of features to output a first type of vehicle from the set of vehicle types.

14. The method according to claim 13, wherein the set of vehicle types comprises one of: a full hybrid electric vehicle (FHEV) and a non-full hybrid electric vehicle (non-FHEV).

15. The method according to claim 13, further comprising:

receiving a set of values associated with the set of features from a second vehicle, wherein the second vehicle is different from the first set of vehicles based on which the machine learning model is generated;

applying the generated machine learning model on the received set of values of the second vehicle; and recommending the first type of vehicle based on the output of the generated machine learning model to a user associated with the second vehicle.

16. The method according to claim 15, further comprising:

controlling the generated machine learning model to output a final value based on the application of the generated machine learning model on the received set of values of the second vehicle;

comparing the output final value with a threshold value, wherein the threshold value is a value that differentiates a class of the first type of vehicle from a class of a second type of vehicle in the set of vehicle types;

recommending the first type of vehicle in a case where the output final value is below the threshold value; and recommend the second type of vehicle in a case where the output final value is equal to or above the threshold value, wherein the recommended first type of vehicle is one of a full hybrid electric vehicle (FHEV), a Non-full hybrid electric vehicle (Non-FHEV) or other types of vehicles, wherein the other types of vehicles include a micro hybrid electric vehicles (S&S), a mild hybrid electric vehicles (MHEV), and a Plug-in hybrid electric vehicles (PHEV).

17. The method according to claim 13, further comprising:

associating a weight parameter with each feature of the set of features; and generating the machine learning model which is trained based on the weight parameter associated with each feature of the set of features to output the first type of vehicle from the set of vehicle types.

18. The method according to claim 13, wherein the plurality of sensors comprises one of an engine speed sensor, a vehicle speed sensor, a fuel gauge sensor, a temperature sensor, a navigation sensor, a real-time clock, a throttle position sensor, or a battery sensor.

19. The method according to claim 13, wherein the generated machine learning model is a binary classification model which is further based on one of random forest algorithm, decision trees, Bayesian networks, support vector machines, neural networks, deep learning models, logistic regressions, or Probit model.

20. A non-transitory computer-readable medium having stored thereon, computer executable instructions that when executed by a computer, causes the computer to execute operations, the operations comprising:

receiving vehicle log data from a plurality of sensors associated with each of a first set of vehicles, wherein the first set of vehicles are classified based on a set of vehicle types;

generating vehicle trip data, associated with a plurality of trips of each of the first set of vehicles, based on the received vehicle log data, wherein the vehicle trip data includes information of a plurality of refueling events of the first set of vehicles;

determining a set of features, associated with the plurality of trips or with information about the first set of vehicles, based on the generated vehicle trip data, wherein the set of features comprises a first subset of features, the first subset of features indicates a fueling behavior of the first set of vehicles corresponding to the plurality of refueling events of the first set of vehicles, and the first subset of features includes a remaining mileage range at which a refueling frequency is the highest for each of the first set of vehicles, and a value of the refueling frequency; and generating a machine learning model which is trained based on the determined set of features to output a first type of vehicle from the set of vehicle types.

* * * * *